W. H. HART, Jr.
Necktie.
No. 7,909. Reissued Oct. 9, 1877.
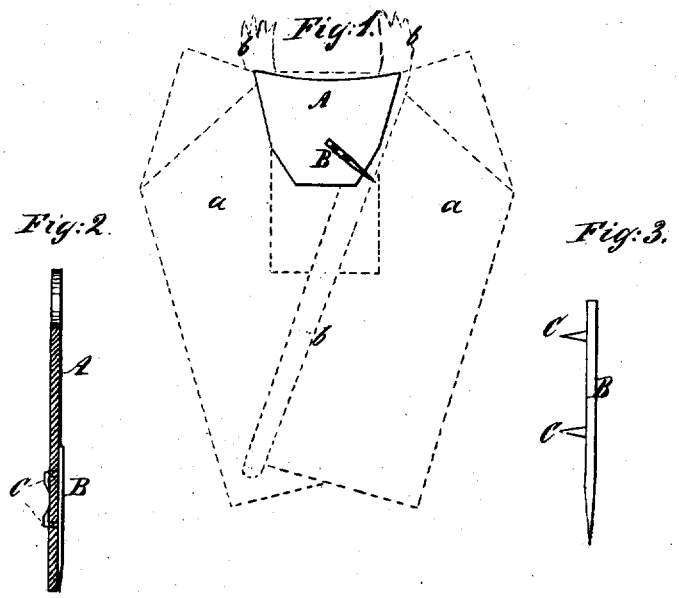
Witnesses:
Geo. M. Baker
L. J. Macvey
Inventor:
Wm H. Hart Jr.
by Butz Lutzbury & Butz
attorneys
N. PETERS, PHOTO-LITHOGRAPHER, WASHINGTON, D. C.

UNITED STATES PATENT OFFICE.

WILLIAM H. HART, JR., OF PHILADELPHIA, PENNSYLVANIA.

IMPROVEMENT IN NECK-TIES.

Specification forming part of Letters Patent No. 159,921, dated February 16, 1875; Reissue No. 7,909, dated October 9, 1877; application filed July 12, 1877.

*To all whom it may concern:*

Be it known that I, WILLIAM H. HART, JR., of the city and county of Philadelphia, and the State of Pennsylvania, have invented a new and useful Improvement in Neck-Ties; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a face view of the device embodying my invention. Fig. 2 is a side view thereof, partly in section. Fig. 3 is a side view, enlarged, of a detached part.

Similar letters of reference indicate corresponding parts in the several figures.

In the class of neck-ties wherein the front bow, which is made long and lies on the chest, is held in position by a band which passes around the neck, it is necessary to secure said band in some manner to prevent displacement of the tie. For this purpose pins have been sewed to the shields or supporting-plates of the ties and the neck-bands engaged therewith; but this is objectionable, since the pin soon loosens and is lost. Again, the cost of thus attaching the pins is a matter of considerable moment.

My invention is designed to remedy these defects; and consists in securing the pins to the shields by metallic fastenings, whereby the pins are firmly retained in place, longer service is rendered thereby, and there is a cheapness in the product.

Referring to the drawings, A represents a shield or supporting-plate for a neck-tie, which consists of a long bow or knot, *a*, constituting the front portion, and a band, *b*, which passes around the neck, the two parts being shown in dotted lines.

To the bottom portion of the shield or plate I secure a pin, B, which projects downwardly, so that the band *b* may be attached thereto, in order that the band will not disengage from the neck and release the tie. I secure the pin to the shield by metallic rivets or projections C, which readily clinch on the shield and firmly connect the two parts.

These rivets or projections are attached to the pin in any suitable manner, and they may be parts of the pin itself, or they may be separate pieces of metal fastened to it. Thus they may be passed through the flattened body of the pin and headed, or they may be punched out of the said body.

The metallic rivet or projection is passed through the shield, and is bent over and clinched upon the opposite side.

It will be seen that the connection of the pin and shield is firm and durable, whereas the threads formerly in use, passing through openings in the pin, were cut by their edges, or rotted away from corrosion of the pin through perspiration, and the pin was soon lost or loosened.

Again, as the work can be performed by machinery, instead of stitching or sewing by hand, labor is materially reduced, whereby there is a great saving in the cost of production.

I do not claim any particular method of attaching the metallic fastenings to the pin, since any of the well-known methods of attaching metals together may be employed—either cohesion by welding or soldering, or forming both pin and fastenings out of one piece of metal, or adhesion and pressure by making one metal inclose the other; but

What I claim as my invention, and desire to secure by Letters Patent, is—

1. The pin B and neck-tie shield A, in combination with the metallic fastening C, substantially as and for the purpose set forth.

2. The pin B, formed with the fastening C, in combination with the neck-tie shield A, substantially as and for the purpose set forth.

3. A metallic fastening or metallic fastenings, C, attached to and projecting from the pin B, substantially as and for the purpose set forth.

WM. H. HART, JR.

Witnesses:

EMANUEL FURTH,

FRANK P. PRICHARD.